US010001910B2

(12) United States Patent
Seo

(10) Patent No.: US 10,001,910 B2
(45) Date of Patent: Jun. 19, 2018

(54) MOBILE TERMINAL AND CONTROLLING METHOD THEREOF FOR CREATING SHORTCUT OF EXECUTING APPLICATION

(71) Applicant: LG ELECTRONICS INC., Seoul (KR)

(72) Inventor: Dongwook Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 283 days.

(21) Appl. No.: 14/443,153

(22) PCT Filed: Jan. 21, 2015

(86) PCT No.: PCT/KR2015/000637
§ 371 (c)(1),
(2) Date: May 15, 2015

(87) PCT Pub. No.: WO2016/010221
PCT Pub. Date: Jan. 21, 2016

(65) Prior Publication Data
US 2016/0283090 A1 Sep. 29, 2016

(30) Foreign Application Priority Data
Jul. 16, 2014 (KR) .................. 10-2014-0090001

(51) Int. Cl.
G06F 3/0484 (2013.01)
H04M 1/725 (2006.01)
(Continued)

(52) U.S. Cl.
CPC .......... G06F 3/04847 (2013.01); G06F 3/048 (2013.01); G06F 3/0482 (2013.01);
(Continued)

(58) Field of Classification Search
CPC .. G06F 3/127; G06F 3/04817; G06F 3/04847; G06F 3/0482; G06F 3/0486;
(Continued)

(56) References Cited

U.S. PATENT DOCUMENTS 6,996,445 B1* 2/2006 Kamijo .................. G06F 3/165
381/104
8,351,915 B2* 1/2013 Park .................. H04M 1/72525
455/414.1
(Continued)

FOREIGN PATENT DOCUMENTS

CN 101199130 A 6/2008
CN 101950264 A 1/2011
(Continued)

OTHER PUBLICATIONS

Anonymous, "Create a Android launch icon for Website," URL: http://stackoverflow.com/questions/22167594/create-a-android-launch-icon-for-website, Mar. 4, 2014, pp. 1-6, XP055336943.

Primary Examiner — Nicholas Ulrich
(74) Attorney, Agent, or Firm — Birch, Stewart, Kolasch & Birch, LLP

(57) ABSTRACT

The present invention relates to a mobile terminal and controlling method thereof. After setting information related to an executing operation of content has been saved, an item for executing the content is displayed. When the item is selected, the content is run in a setting state corresponding to the setting information. Particularly, operating state information on a specific operation timing point of content is registered as a shortcut and saved. An item of the shortcut is displayed on a screen. When the item is selected, the content is directly executed from a timing point corresponding to the operating state information. Accordingly, when the content (Continued)

is executed, the content can be executed from a user-desired part by skipping a part unnecessary for a user.

9 Claims, 21 Drawing Sheets

(51) Int. Cl.
*G06F 3/0488* (2013.01)
*G06F 3/0486* (2013.01)
*G06F 3/048* (2013.01)
*H04B 1/40* (2015.01)
*G06F 3/0482* (2013.01)

(52) U.S. Cl.
CPC .......... *G06F 3/0484* (2013.01); *G06F 3/0486* (2013.01); *G06F 3/04842* (2013.01); *G06F 3/04883* (2013.01); *H04B 1/40* (2013.01); *H04M 1/72566* (2013.01); *H04M 1/72583* (2013.01); *H04M 1/72563* (2013.01)

(58) Field of Classification Search
CPC .. G06F 3/04883; G06F 3/04842; G06F 3/048; G06F 3/0484; H04M 1/72566; H04M 1/72563; H04M 1/72569; H04B 1/40
USPC ........................................................ 715/847
See application file for complete search history.

(56) References Cited

U.S. PATENT DOCUMENTS

| | | | |
|---|---|---|---|
| 9,408,152 B2* | 8/2016 | Kim | |
| 2005/0017994 A1* | 1/2005 | Oh | G09G 3/3406 345/691 |
| 2005/0204125 A1* | 9/2005 | Chin | G06F 9/4411 713/100 |
| 2008/0153469 A1 | 6/2008 | Park et al. | |
| 2008/0234849 A1* | 9/2008 | Han | G11B 27/105 700/94 |
| 2009/0106704 A1* | 4/2009 | De Leon | G06F 3/0238 715/847 |
| 2009/0271503 A1* | 10/2009 | Pearce | H04M 3/42178 709/220 |
| 2010/0153862 A1* | 6/2010 | Schreiber | G06Q 30/0273 715/760 |
| 2010/0180229 A1 | 7/2010 | Lee | |
| 2012/0115453 A1* | 5/2012 | Zheng | H04M 1/72569 455/418 |
| 2013/0157722 A1 | 6/2013 | Kim et al. | |
| 2014/0173521 A1* | 6/2014 | Mayor | H04M 1/72519 715/835 |
| 2014/0189597 A1* | 7/2014 | Kang | G06F 3/0488 715/835 |
| 2015/0055801 A1* | 2/2015 | Wu | H04R 3/00 381/107 |
| 2015/0249733 A1* | 9/2015 | Miura | H04M 1/72563 455/566 |

FOREIGN PATENT DOCUMENTS

| | | |
|---|---|---|
| CN | 103179266 A | 6/2013 |
| KR | 10-2006-0108781 A | 10/2006 |
| KR | 10-2006-0132313 A | 12/2006 |
| KR | 10-2012-0025107 A | 3/2012 |
| WO | WO 2014/050881 A1 | 4/2014 |

* cited by examiner

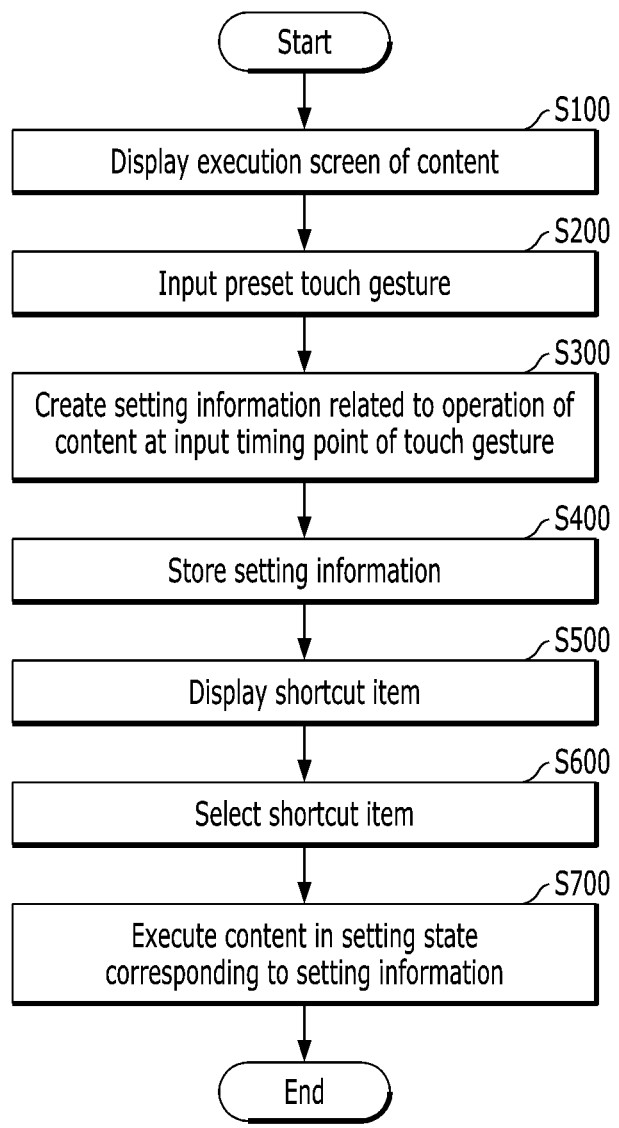

FIG. 3C
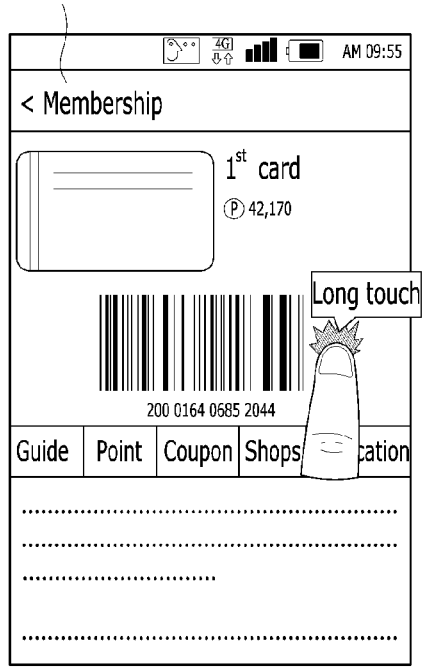
(a)
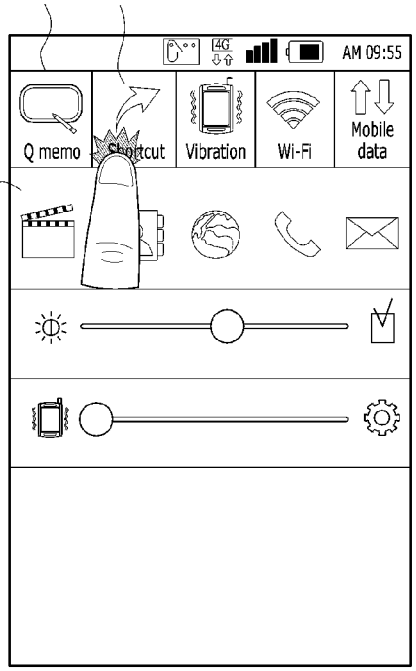
(b)
(d)
(c)

FIG. 3E
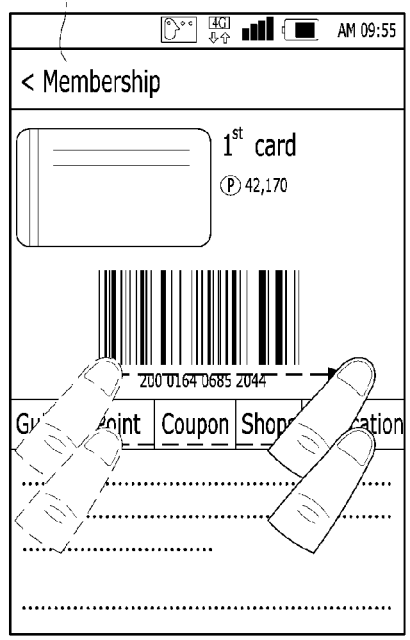
(a)
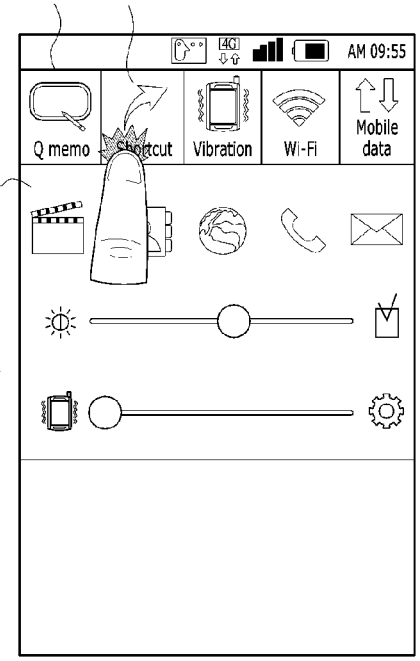
(b)
(d)
(c)

FIG. 4A
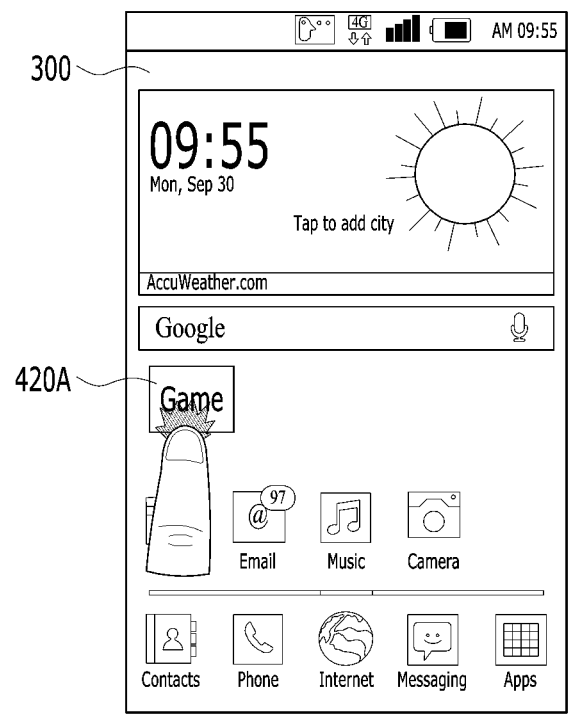
(a)
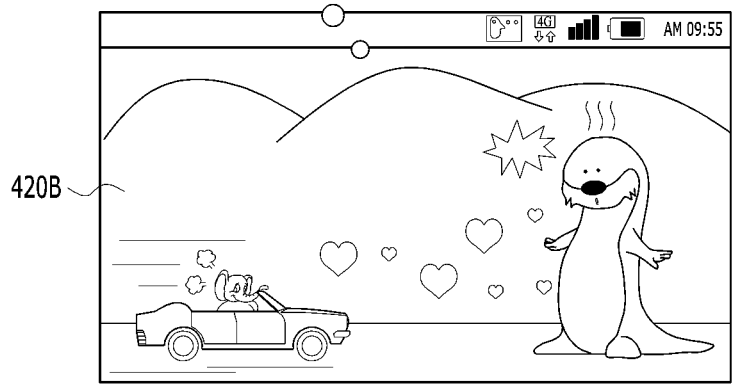
(b)

FIG. 5A
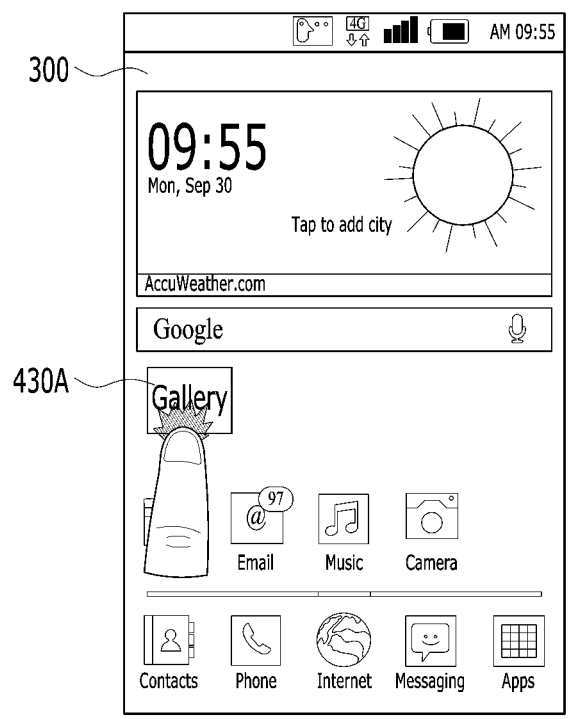
(a)
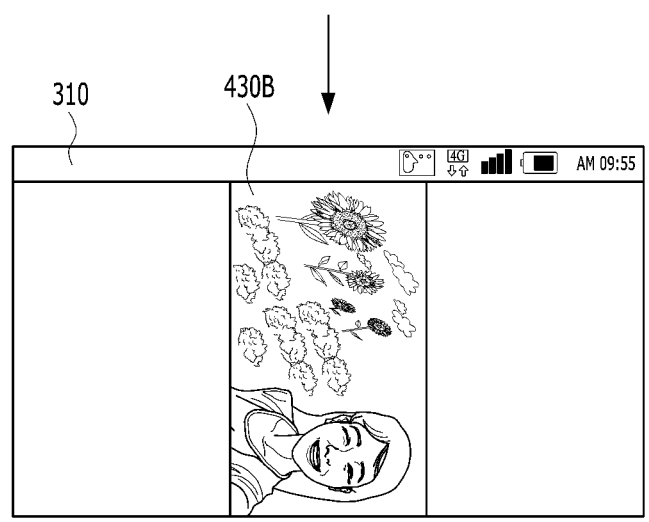
(b)

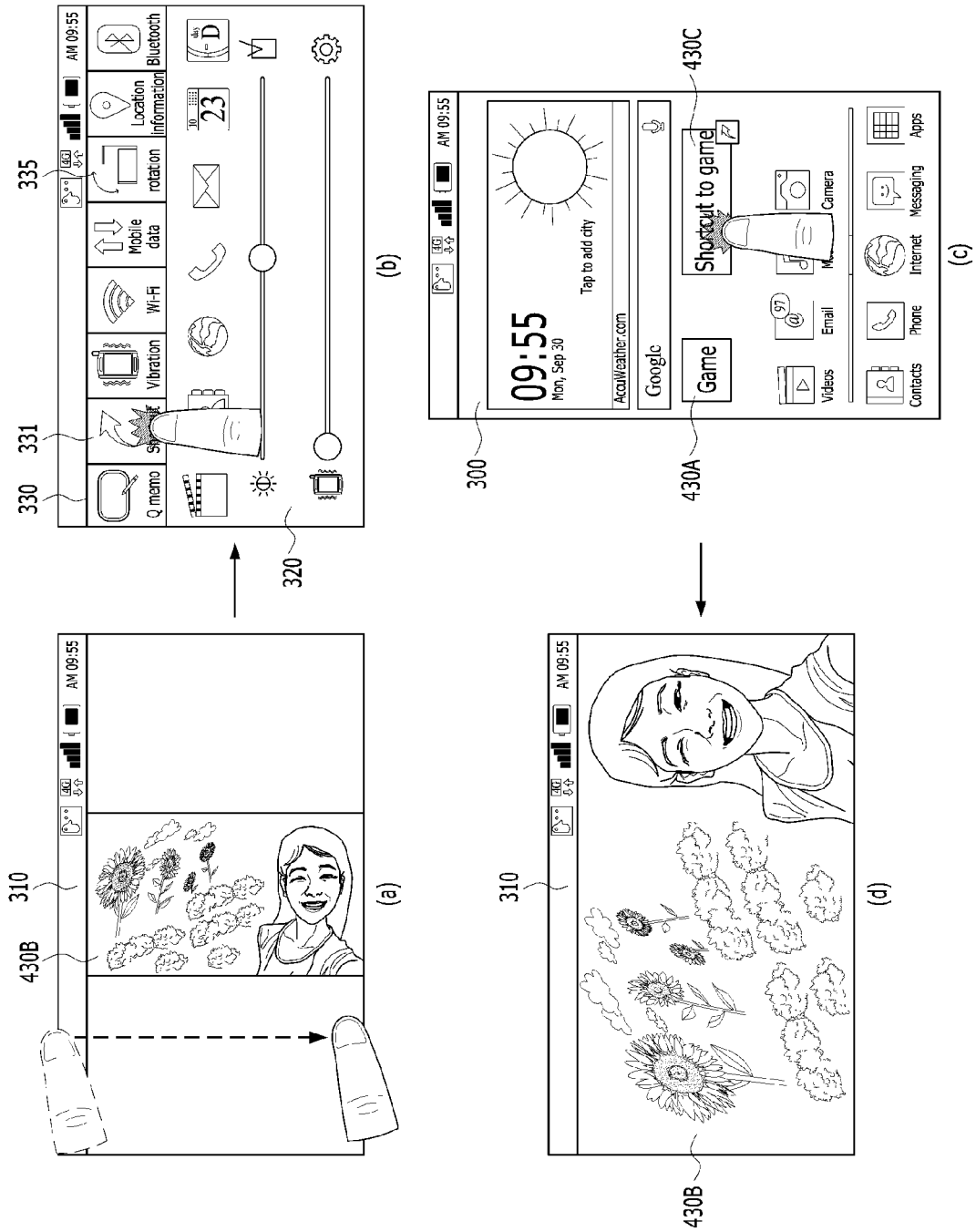

FIG. 6A
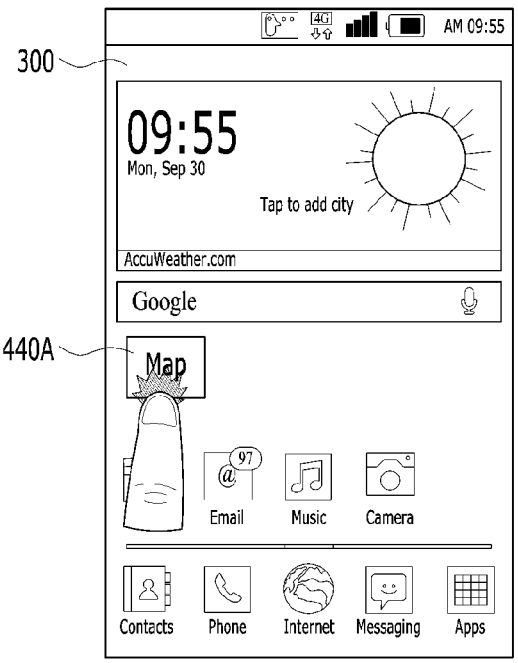
(a)
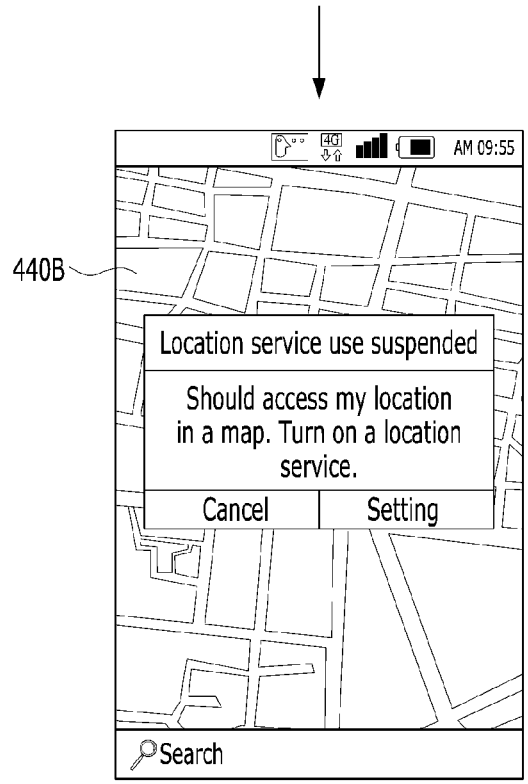
(b)

FIG. 6B
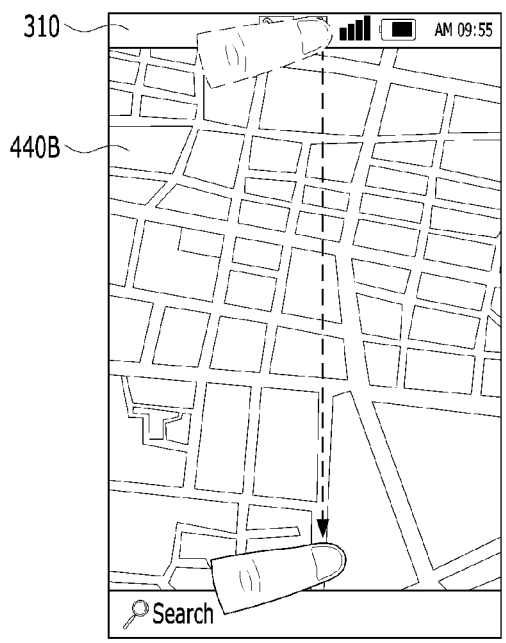
(a)
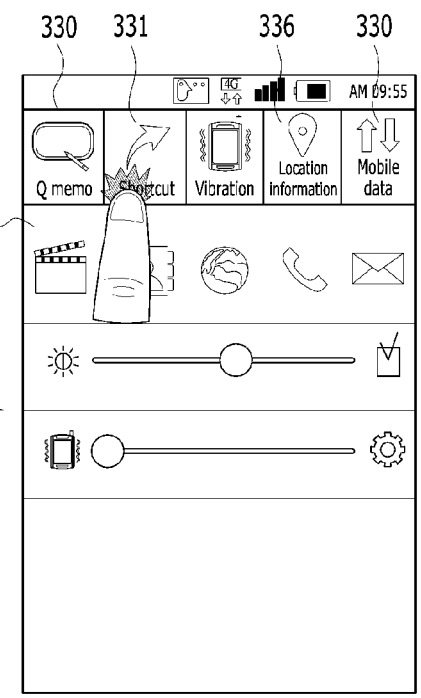
(b)
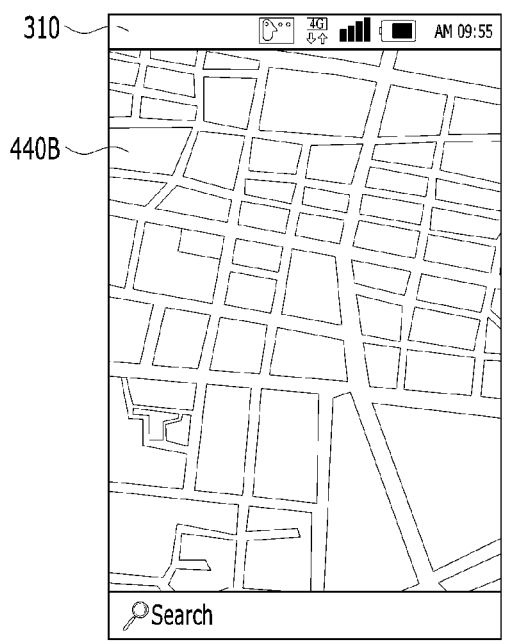
(d)
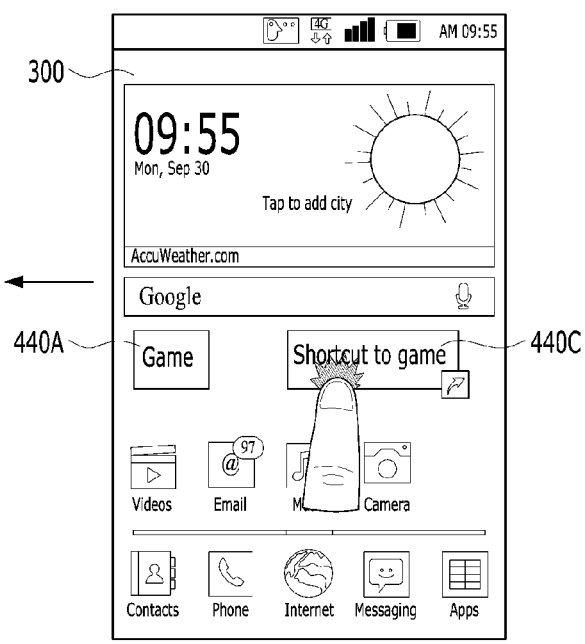
(c)

FIG. 8
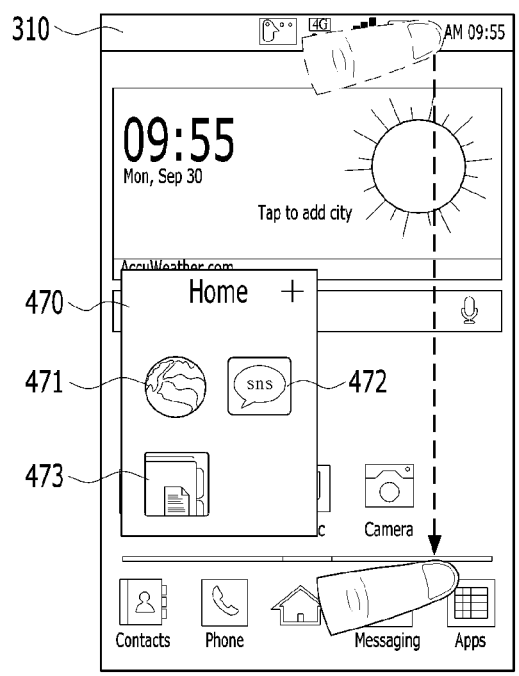
(a)
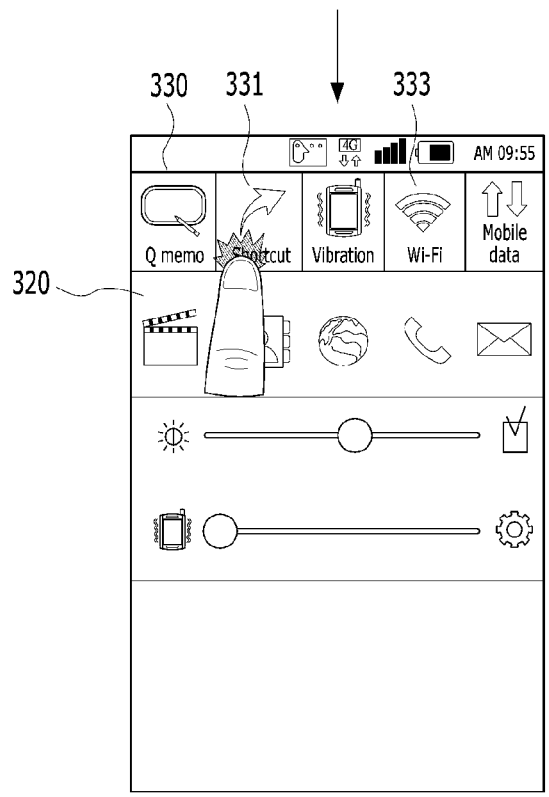
(b)

FIG. 9
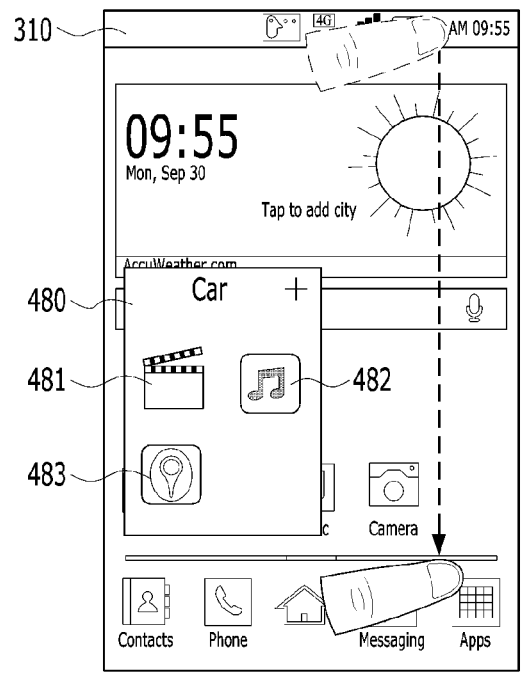
(a)
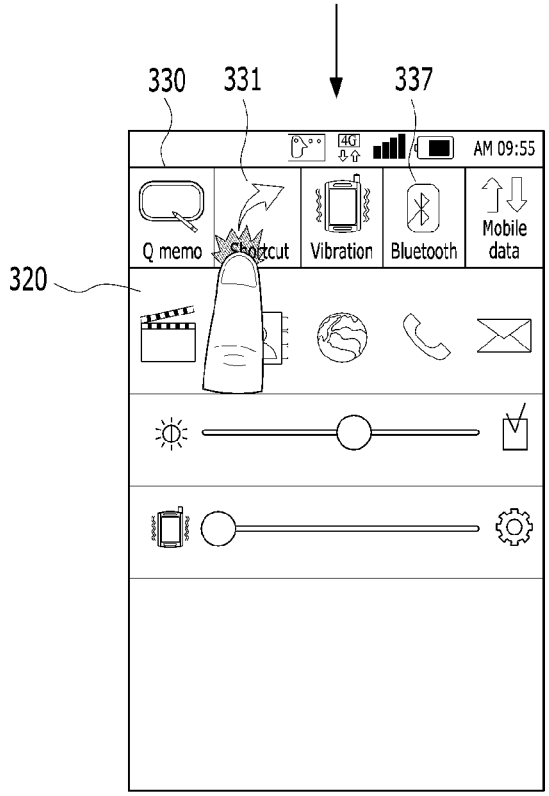
(b)

FIG. 11
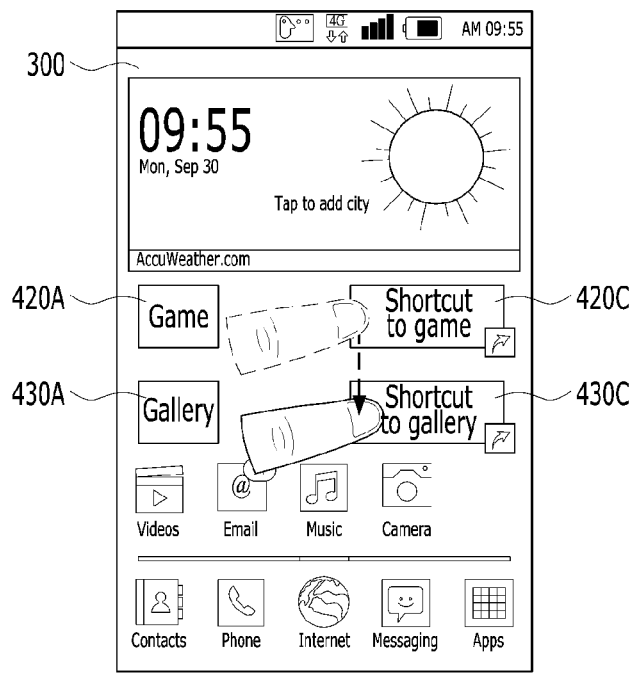
(a)
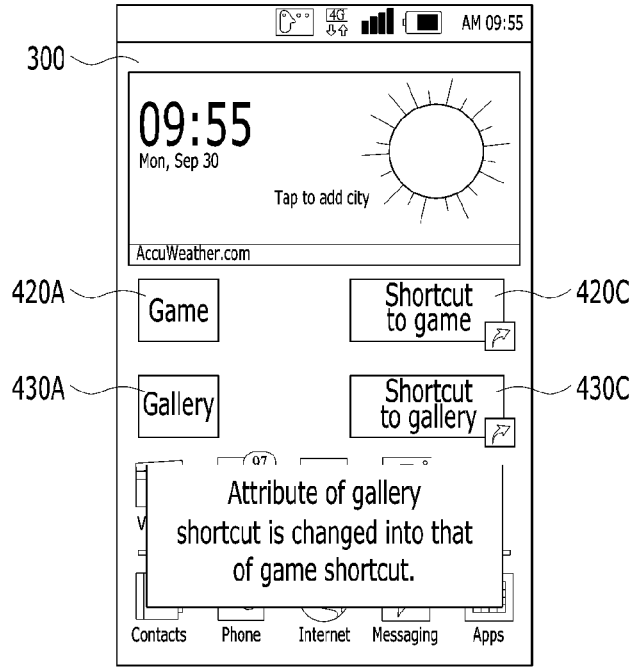
(b)

FIG. 12
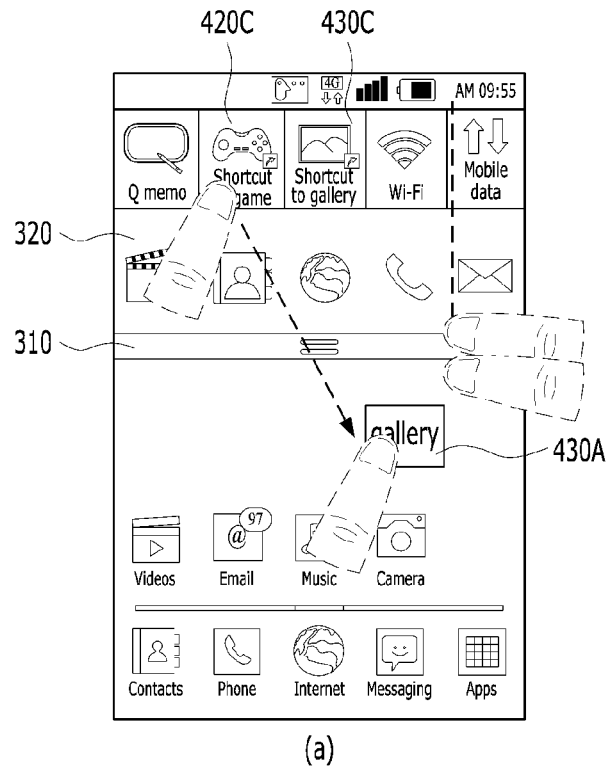
(a)
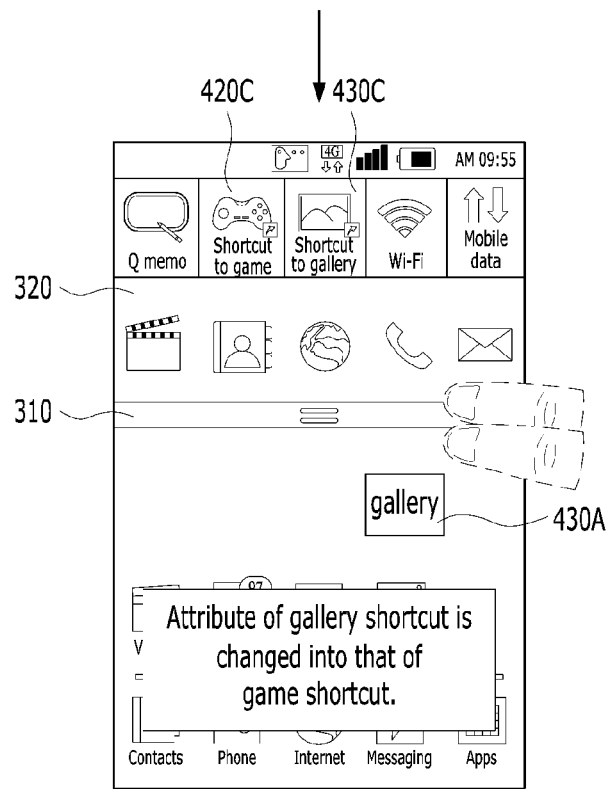
(b)

MOBILE TERMINAL AND CONTROLLING METHOD THEREOF FOR CREATING SHORTCUT OF EXECUTING APPLICATION

BACKGROUND OF THE INVENTION

Field of the Invention

The present invention relates to a mobile terminal, and more particularly, to a mobile terminal and a method of controlling the mobile terminal.

Description of Background Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, such a terminal as a smartphone is equipped with applications of various types and a user is able to use various functions through the applications.

However, when an application is run initially, it is inconvenient to manipulate operations of the application one by one in order to enter a screen of a desired one of function provided by the corresponding application.

Moreover, when an application is run initially, if a function such as a sound output and the like among functions provided by the application is run in direct, it is inconvenient for a user to change a configuration setting of a terminal for the functions of the application one by one.

SUMMARY OF THE INVENTION

Accordingly, embodiments of the present invention are directed to a mobile terminal and controlling method thereof that substantially obviate one or more problems due to limitations and disadvantages of the related art. And, the technical task of the present invention is to provide a mobile terminal and controlling method thereof as follows. First of all, after a setting information related to a running operation of a content has been saved, an item for running the content is displayed. Secondly, if the item is selected, the content is run in a setting state corresponding to the setting information.

In one technical aspect of the present invention, provided herein is a mobile terminal, including a memory configured to store a setting information related to a executing operation of at least one content, a touchscreen configured to display an item for executing the content based on the setting information, and a controller configured to execute the content in a setting state corresponding to the setting information in response to selection of the item.

In another technical aspect of the present invention, provided herein is a method of controlling a mobile terminal, including the steps of storing a setting information related to a executing operation of at least one content, displaying an item for executing the content based on the setting information, and executing the content in a setting state corresponding to the setting information in response to selection of the item.

Accordingly, a mobile terminal and controlling method thereof according to the present invention provide the following effects and/or features.

According to at least one of embodiments of the present invention, after an operating state information on a specific operation timing point of a content has been registered as a shortcut and then saved, an item of the shortcut is displayed on a screen. If the item is selected, the content is directly run from a timing point corresponding to the operating state information. Hence, when the content is run, a part unnecessary for a user is skipped and the content can be run by starting with a part desired by the user.

According to at least one of embodiments of the present invention, after a configuration setting information of a mobile terminal for a content has been registered as a shortcut and saved, an item of the shortcut is displayed on a screen. If the item is selected, the content is directly run in a setting state corresponding to the configuration setting information of the mobile terminal. Hence, it is able to directly use the content in a configuration desired by a user.

BRIEF DESCRIPTION OF THE DRAWINGS

FIG. 2 is a flowchart for a process for controlling a mobile terminal according to one embodiment of the present invention.

FIGS. 3A to 12 are diagrams to describe a process for controlling a mobile terminal according to one embodiment of the present invention.

DETAILED DESCRIPTION OF THE INVENTION

Figure 1A:
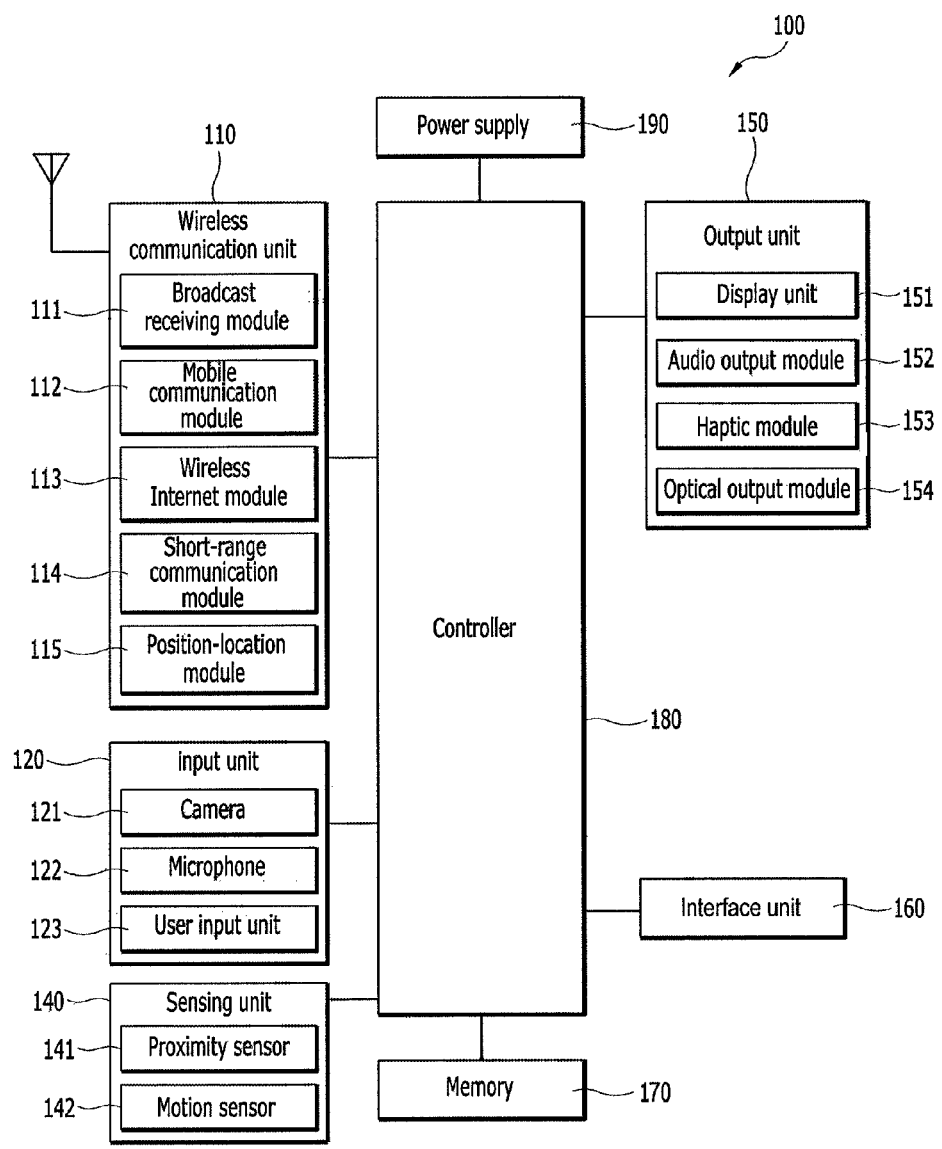
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
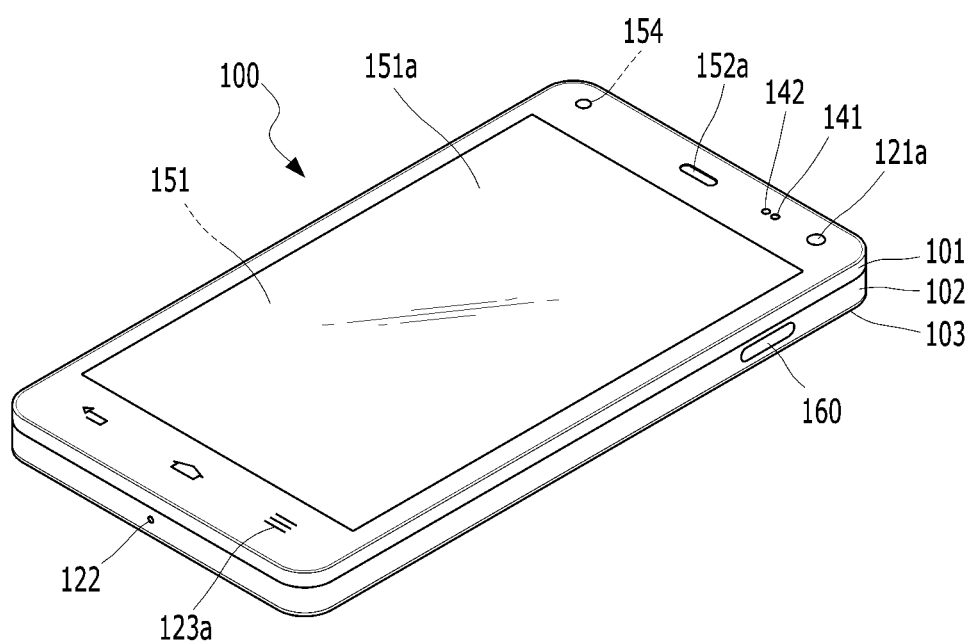
FIGS. 1B and 1C are conceptual views of one example of the mobile terminal, viewed from different directions.
Figure 1C:
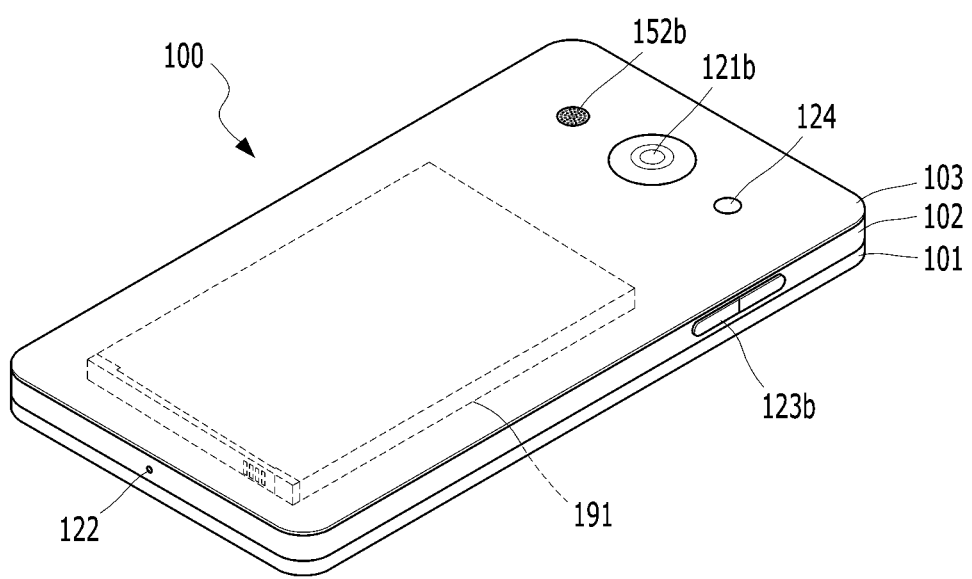

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

For instance, the wireless communication unit 110 typically includes one or more components which permit wireless communication between the mobile terminal 100 and a wireless communication system or network within which the mobile terminal is located To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, and the like) for allowing a user to input information. Data (for example, voice, image, and the like) is obtained by the input unit 120 and may be analyzed and processed as user's control commands.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141, a motion sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement an operation, control and/or controlling method of a mobile terminal according to various embodiments of the present invention mentioned in the following description. Moreover, the operation, control and/or controlling method of the mobile terminal can be implemented on the mobile terminal by running at least one application program saved in the memory 170.

Prior to describing various embodiments implemented through the above-mentioned mobile terminal 100, the above-listed components shall be described in detail with reference to FIG. 1A as follows.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of the wireless signals include audio call signals, video call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE, and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100).

The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 is shown having components such as the display unit 151, first audio output unit 152a, second audio output unit 152b, the proximity sensor 141, the illumination sensor 142, first camera 121a, second camera 121b, first manipulation unit 123a, second manipulation unit 123b, the microphone 122 and the interface unit 160.

In the following description, referring to FIG. 1B and FIG. 1C, explained as one example is a mobile terminal configured as follows. First of all, a display unit 151, a $1^{st}$ audio output unit 152a, a proximity sensor 141, an illumination sensor 142, a light output unit 154, a $1^{st}$ camera 121a and a $1^{st}$ manipulation unit 123a are disposed on a front surface of the terminal body. Secondly, a $2^{nd}$ manipulation unit 123b, a microphone 122 and an interface unit 160 are disposed on a lateral surface of the terminal body. Thirdly, a $2^{nd}$ audio output unit 152b and a $2^{nd}$ camera 121b are disposed on a rear surface of the terminal body.

Yet, the above configuration is non-limited by the above disposition. The above configuration may be excluded if necessary. The above configuration may be disposed on other surfaces. For instance, the $1^{st}$ manipulation unit 123a may not be provided to the front surface of the terminal body and the $2^{nd}$ audio output unit 152b may be provided not to the rear surface of the terminal body but to the lateral surface of the terminal body.

The display unit 151 may display (output) information processed by the mobile terminal 100. For example, the display unit 151 may display information of a executed screen of application program operated by the mobile terminal 100 or User Interface (UI) information, Graphic User Interface (GUI) information according to the information of the executed screen of the application program.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit.

When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver to transmit a call voice to an ear of the user and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the following description, embodiments related to a control method implemented in the above-configured mobile terminal are described in detail with reference to the accompanying drawings.

First of all, a following process according to the present invention shall be described in detail with reference to FIGS. 2 to 12. In particular, after an operating state information on a specific operation timing point of a content has been registered as a shortcut and then saved, an item of the shortcut is displayed on a screen. If the item is selected, an application is directly run from a timing point corresponding to the operating state information. Hence, when the application is run, a part unnecessary for a user is skipped and the application can be run by starting with a part desired by the user.

Secondly, a following process according to the present invention shall be described in detail. In particular, after a configuration setting information of a mobile terminal for a content has been registered as a shortcut and saved, an item of the shortcut is displayed on a screen. If the item is selected, the content is directly run in a setting state corresponding to the configuration setting information of the mobile terminal. Hence, it is able to directly use the content in a configuration desired by a user.

In this case, the content includes every information that can be run, used or displayed by the mobile terminal 100. For instance, the content may include at least one of a broadcast, a video, a music, a photo, a game, a document, a map, a navigation, a menu function, an application, a widget, a standby screen, a home screen, a folder keeping at least one application therein, and the like.

In the following description, the content is assumed as an application supportive of a specific function or a folder having at least one application kept therein. Of course, a type of a content of the present invention is non-limited by the application or the folder.

FIG. 2 is a flowchart for a process for controlling a mobile terminal according to one embodiment of the present invention.

Referring to FIG. 2, the controller 180 of the mobile terminal 100 displays at least one content on a screen of the touchscreen 151. If a running command for running the displayed content is inputted through the user input unit 123 or the touchscreen 151 by a user, the controller 180 runs the content and displays a running screen of the content on the touchscreen 151 [S100].

The controller 180 detects whether a preset touch gesture is inputted to the running screen of the content through the touchscreen 151. If it is detected that the preset touch gesture is inputted [S200], the controller 180 obtains a setting state related to an operation of the content at a timing point of the input of the preset touch gesture, creates a setting information including the obtained setting state [S300], and then saves the created setting information in the memory 170 [S400].

In this case, the setting information includes at least one of an operating state information on a specific operation timing point of the content and a configuration setting information of the mobile terminal in association with the operation of the content. Preferably, the operating state information is the information for the content to be run from the specific operation timing point in case of running the content in the future. As a configuration setting value of at least one component within the mobile terminal in association with the operation of the content in case of running the content, the configuration setting information is the information for the content to be run in a setting state corresponding to the configuration setting information when in case of running the content in the future.

Meanwhile, the touch gesture for the setting information creation may have one of various patterns.

For instance, after at least two points on the running screen of the content have been touched, while the touch to the at least two points are maintained, the touch gesture may have a pattern of a drag in a specific direction.

For another instance, the touch gesture may include a pinch-in touch gesture inputted to the running screen of the content. In particular, while a $1^{st}$ point and a $2^{nd}$ point on the running screen of the content are touched, the pinch-in touch gesture may mean a touch gesture performed in a manner that a distance between the $1^{st}$ point and the $2^{nd}$ point is reduced into a preset distance or shorter by a user's drag action.

For another instance, the touch gesture may include a long touch inputted to a specific point within the running screen of the content. In particular, while the specific point is touched, the long touch may mean a touch gesture in a state that a duration time of the corresponding touch exceeds a preset time.

For another instance, while a notification bar located at a top end in the running screen of the content is touched, the touch gesture may have a pattern of applying a drag toward a bottom end of the running screen.

In doing so, if the notification bar is dragged to the bottom end of the running screen, the controller 180 displays a notification window switched from the running screen. If a menu for a creation of the setting information is selected from the notification window, the controller 180 creates a setting information related to a running operation of the content at a timing point of selecting the menu and is then able to save the created setting information in the memory 170.

The notification window includes a UI (user interface) for setting various components and functions (e.g., mobile data reception ON/OFF, Wi-Fi free internet ON/OFF, portrait/landscape mode switching, memo function execution, bell sound/vibration setup, etc.) of the mobile terminal 100 and may mean a window configured to display information indicating an event occurrence in the mobile terminal 100 and information indicating various operating states of the mobile terminal.

Meanwhile, on behalf of the step S100 to S300, while a screen including an item indicating at least one content is displayed, if the item is selected, the controller 180 displays a user interface for a configuration setting of the mobile terminal 100 in association with an operation of the content. If a configuration of the mobile terminal for the operation of the mobile terminal 100 is set through the configuration setting UI or an existing configuration setting is changed, the controller 180 may be able to save the set or changed configuration setting in the memory 170 as the setting information. For instance, if the screen includes a home screen including items of a multitude of applications and an item of a specific application in the home screen is long touched, the controller 180 can display the configuration setting UI on the home screen.

Subsequently, a step S500 shown in FIG. 2 is described as follows. First of all, if the setting information is saved, the controller 180 creates a shortcut item for running the content based on the configured setting information and then displays the created shortcut item [S500].

In doing so, the shortcut item may be displayed on at least one of a standby screen of the mobile terminal 100, a background screen, a home screen, the notification window, a running screen of the content and the like. Moreover, the shortcut item may be displayed on a screen that is equal to or different from that of an original item for running the corresponding content originally.

The shortcut item can indicate at least one of a category of the corresponding content, a name of the corresponding content, a representative image of the corresponding content, a running screen image of the corresponding content at a timing point of the creation, and a configuration setting state of the mobile terminal 100 for the corresponding content at the creation timing point. Moreover, if there are at least two shortcut items for a single content, the at least two shortcut items may be displayed in a manner of being stacked on each other or grouped together.

If the shortcut item is selected [S600], the controller 180 searches the memory 170 for a setting information of the content corresponding to the selected shortcut item and then runs the content corresponding to the selected shortcut item in a setting state corresponding to the found setting information [S700].

In this case, the found setting information may include at least one of an operating state information on a specific operating timing point of the content corresponding to the selected shortcut item and the configuration setting information of the mobile terminal 100 in association with the operation of the content.

In particular, the controller 180 is able to directly run the content from a timing point corresponding to the operating state information on the specific operation timing point of the content. And, the controller 180 may be able to directly run the content in the setting state corresponding to the configuration setting information of the mobile terminal 100 for the content. Moreover, the controller 180 directly runs the content from the timing point corresponding to the operating state information on the specific operation timing point of the content but may be able to directly run the content in the setting state corresponding to the configuration setting information of the mobile terminal 100 for the content.

In the following description, the process shown in FIG. 2 is described in detail with reference to FIGS. 3 to 13.

Figure 3A:
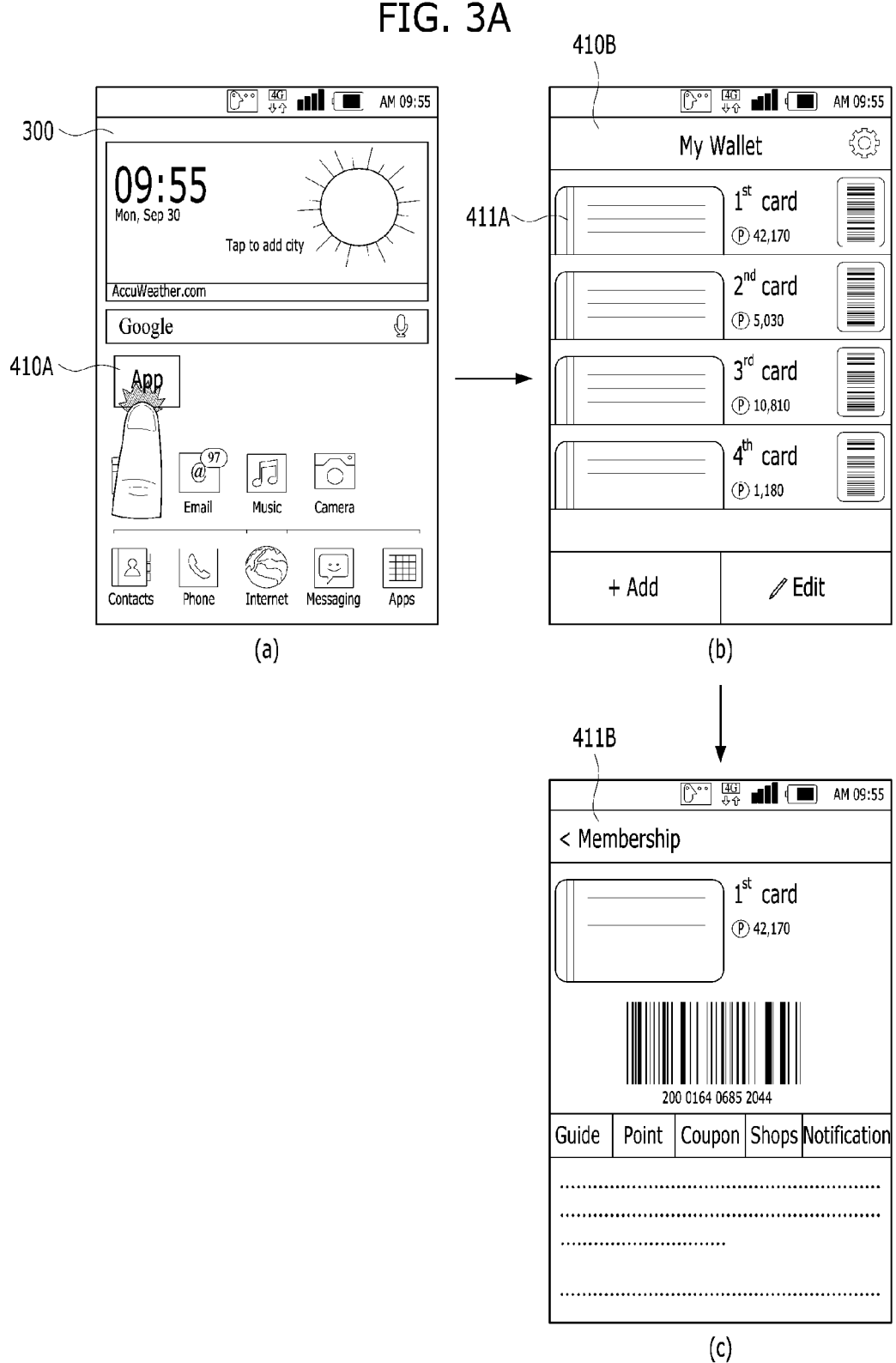

First of all, FIG. 3A shows a running process if the content includes an existing card collection application.

Referring to FIG. 3A, if an item 410A of a card collection application is selected from a home screen 300 [FIG. 3A (a)], the controller 180 displays a running screen 410B of the card collection application [FIG. 3A (b)]. If a specific card 411A is selected from cards included in the running screen 410B of the card collection application, the controller 180 displays a card information screen 411B on which detailed information of the selected card 411A is displayed [FIG. 3A (c)].

As mentioned in the above description, according to a related art, in order to watch the card information screen 411B of the selected card 411A shown in FIG. 3A (c), it is inconvenient for a user to perform the steps shown in FIGS. 3A (a) to 3A (c).

Yet, according to the following description of the present invention with reference to FIGS. 3B to 3E, a user can directly use the card information screen 411B of the card 411A as soon as rungs the card collection application through a shortcut item.

Figure 3B:
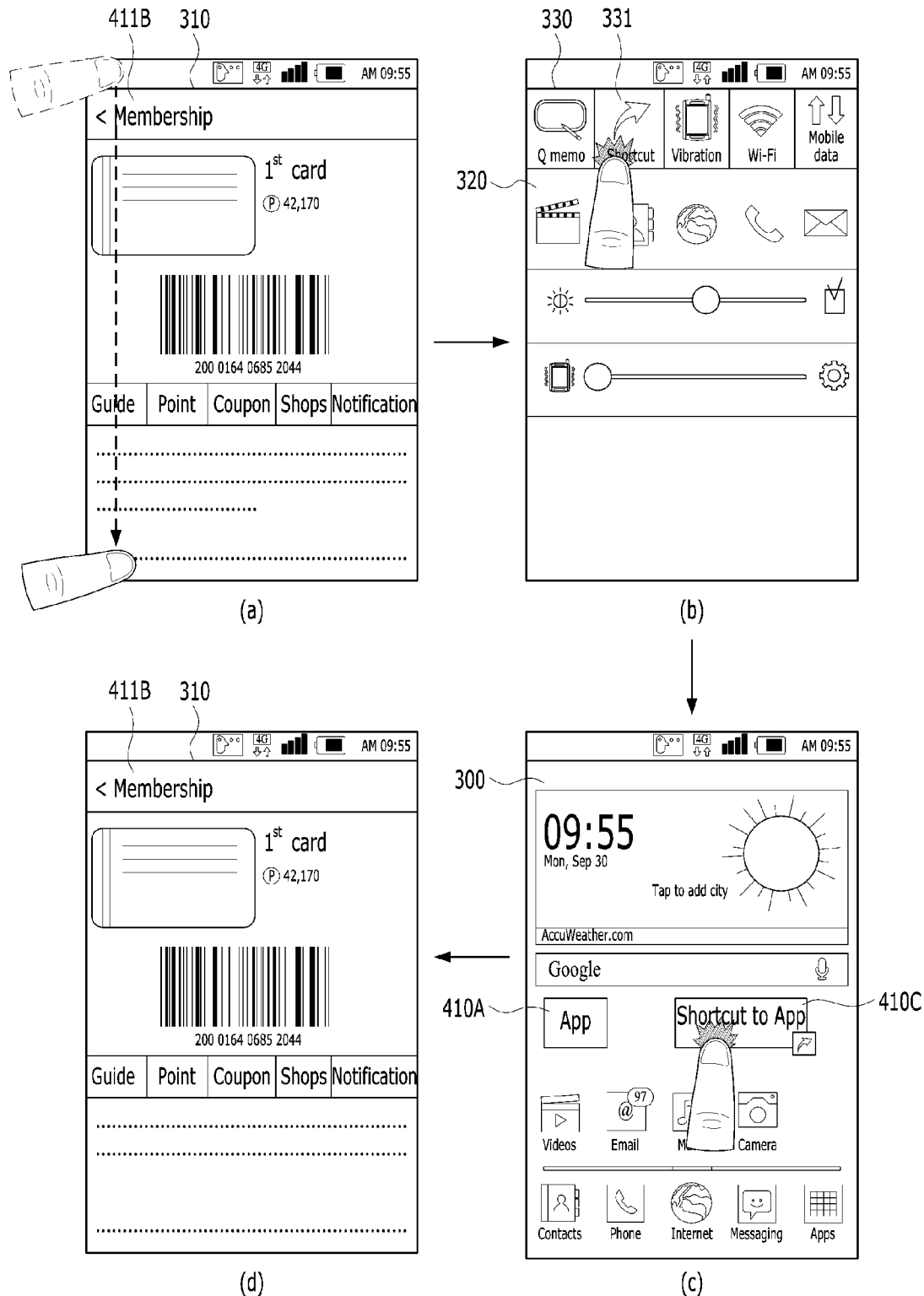

Referring to FIG. 3B, while the controller 180 displays the card information screen 411B on which the detailed information of the card 411A desired by a user is displayed, if a touch gesture of dragging a notification bar 310 located at a top end of the card information screen 411B to a bottom end of the card information screen 411B is inputted [FIG. 3B (a)], the controller 180 displays a notification window 320 [FIG. 3B (b)].

In this case, as mentioned in the foregoing description, the notification window 320 may include a UI (user interface) for setting various functions (e.g., mobile data reception ON/OFF, Wi-Fi free internet ON/OFF, portrait/landscape mode switching, memo function execution, bell sound/vibration setup, NFC function ON/OFF, etc.) of the mobile terminal 100 and may mean a window configured to display information indicating an event occurrence in the mobile terminal 100 and information indicating various operating states of the mobile terminal 100.

In doing so, a configuration setting UI 330 for the various function settings of the mobile terminal 100 is provided within the notification window 320. And, a shortcut creation menu 331 for the shortcut item creation of the card information screen 411B may be included in the configuration setting UI 330.

In this case, if the shortcut creation menu 331 is selected, the controller 180 creates the setting information, which includes an operating state information of the card information screen 411B at a timing point of selecting the shortcut creation menu 331 and a configuration setting information of the mobile terminal 100 in association with the card information screen 411B, saves the created setting information in the memory 170, and is then able to create and display a shortcut item 410C for a shortcut to the card information screen 411B on a home screen 300 [FIG. 3B (c)].

Meanwhile, a user changes the configuration setting of the mobile terminal 100 for the use of the card information screen 411B into a user-desired setting through the configuration setting UI 330 before selecting the shortcut creation menu 331 and is then able to create the shortcut item 410C by selecting the shortcut creation menu 331. For instance, if a user intends to use the card information screen 411B in a Wi-Fi (i.e., free internet) environment only, the user can create the shortcut item 410C through the configuration setting UI 330 in a manner of turning off a pay internet 'mobile data function', turning on a free internet 'Wi-Fi function', and then selecting the shortcut creation menu from the configuration setting UI 330.

Meanwhile, if the shortcut item 410C is selected, referring to FIG. 3B (d), the controller 180 searches the setting information of the card 411A corresponding to the shortcut item 410C, runs the card collection application, and displays the card information screen 411B at the timing point of creating the shortcut item 410C in the setting state corresponding to the configuration setting information of the mobile terminal in association with the card 411A at the timing point of creating the shortcut item 410C based on the found setting information.

Referring to FIG. 3C, while the controller 180 displays the card information screen 411B on which the detailed information of the card 411A desired by a user is displayed, if a long touch is inputted to the card information screen 411B [FIG. 3C (a)], the controller 180 displays a notification window 320 [FIG. 3C (b)]. If a shortcut creation menu 331 is selected from the notification window 320, the controller 180 creates a setting information including an operating state information of the card information screen 41 lB at a timing point of selecting the shortcut creation menu 331 and a configuration setting information of the mobile terminal 100 in association with the card information screen 411B and then saves the created setting information in the memory 170. Subsequently, the controller 180 creates a shortcut item 410C for a shortcut to the card information screen 411B and is then able to display the created shortcut item 410C on a home screen 300 [FIG. 3C (c)].

Thereafter, if the shortcut item 410C is selected, referring to FIG. 3C (d), the controller 180 displays the card information screen 411B at the timing point of creating the shortcut item 410C in the setting state corresponding to the configuration setting information of the mobile terminal in association with the card 411A at the timing point of creating the shortcut item 410C based on the setting information of the card 411A corresponding to the shortcut item 410C.

Figure 3D:
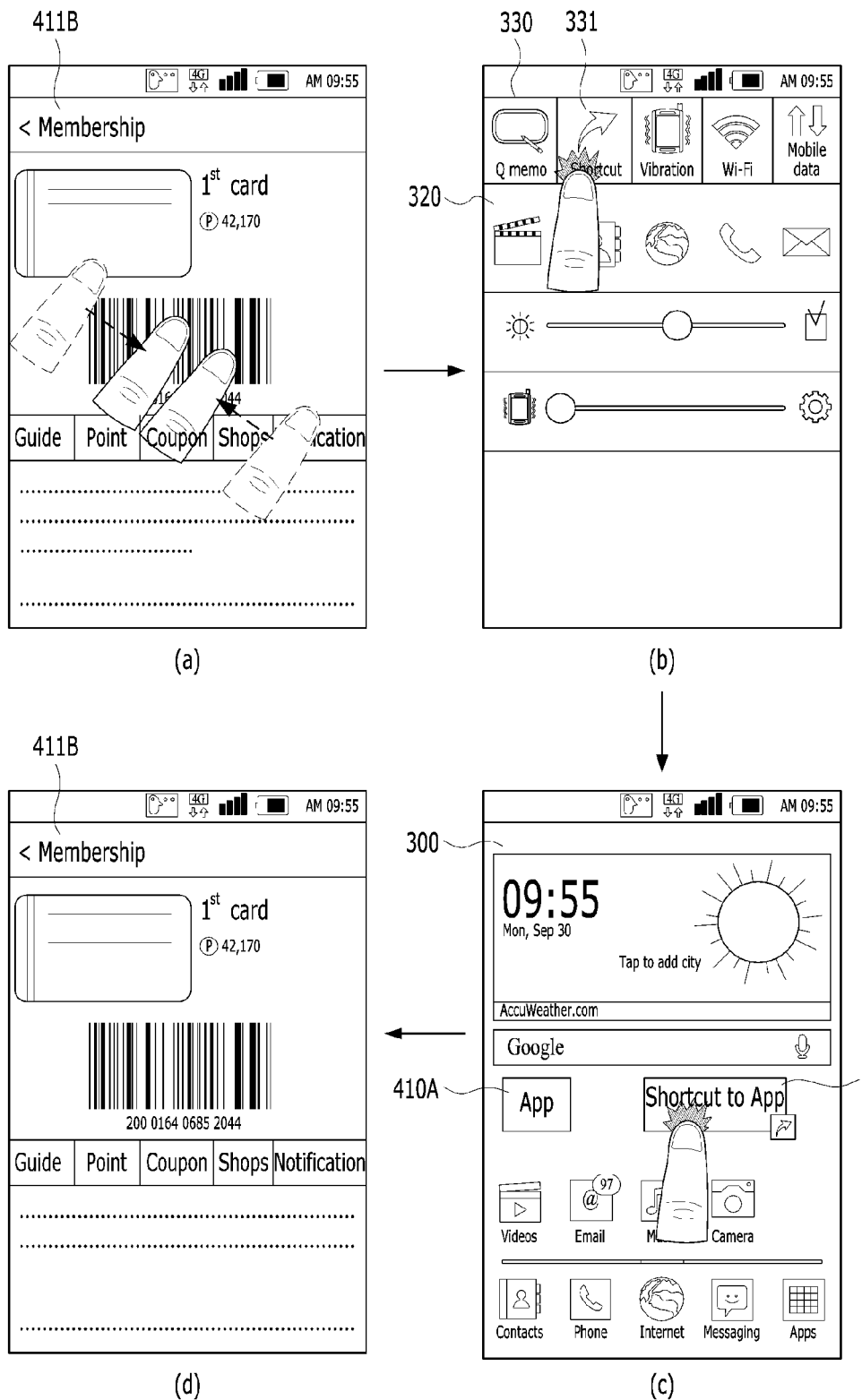

Referring to FIG. 3D, while the controller 180 displays the card information screen 411B on which the detailed information of the card 411A desired by a user is displayed, if a $1^{st}$ point and a $2^{nd}$ point on the card information screen 411B are touched and a distance between the $1^{st}$ point and the $2^{nd}$ point is then decreased into a distance equal to or smaller than a preset distance by maintaining the touches to the and $2^{nd}$ points [FIG. 3D (a)], the controller 180 displays a notification window 320 [FIG. 3D (b)]. If a shortcut creation menu 331 is selected from the notification window 320, the controller 180 creates a setting information including an operating state information of the card information screen 411B at a timing point of selecting the shortcut creation menu 331 and a configuration setting information of the mobile terminal 100 in association with the card information screen 411B and then saves the created setting information in the memory 170. Subsequently, the controller 180 creates a shortcut item 410C for a shortcut to the card information screen 411B and is then able to display the created shortcut item 410C on a home screen 300 [FIG. 3D (c)].

Thereafter, if the shortcut item 410C is selected, referring to FIG. 3D (d), the controller 180 displays the card information screen 411B at the timing point of creating the shortcut item 410C in the setting state corresponding to the configuration setting information of the mobile terminal 100 in association with the card 411A at the timing point of creating the shortcut item 410C based on the setting information of the card 411A corresponding to the shortcut item 410C.

Referring to FIG. 3E, while the controller 180 displays the card information screen 411B on which the detailed information of the card 411A desired by a user is displayed, if at least two points including a $1^{st}$ point and a $2^{nd}$ point on the card information screen 411B are touched and a drag/flicking/stroke is applied in the same direction by maintaining the touches to the $1^{st}$ and $2^{nd}$ points [FIG. 3E (a)], the controller 180 displays a notification window 320 [FIG. 3E (b)]. If a shortcut creation menu 331 is selected from the notification window 320, the controller 180 creates a setting information including an operating state information of the card information screen 411B at a timing point of selecting the shortcut creation menu 331 and a configuration setting information of the mobile terminal 100 in association with the card information screen 411B and then saves the created setting information in the memory 170. Subsequently, the controller 180 creates a shortcut item 410C for a shortcut to the card information screen 411B and is then able to display the created shortcut item 410C on a home screen 300 [FIG. 3E (c)].

Thereafter, if the shortcut item 410C is selected, referring to FIG. 3E (d), the controller 180 displays the card information screen 411B at the timing point of creating the shortcut item 410C in the setting state corresponding to the configuration setting information of the mobile terminal 100 in association with the card 411A at the timing point of creating the shortcut item 410C based on the setting information of the card 411A corresponding to the shortcut item 410C.

According to the descriptions with reference to FIGS. 3B to 3E, a setting information of a corresponding content is created and saved using the shortcut creation menu 331 in the notification window 330. Instead, it is able to create and save a setting information of a corresponding content without the shortcut creation menu 331.

For instance, if the notification bar 310 is dragged to the bottom end of the card information screen 411B in FIG. 3B (a), the controller 180 creates a setting information including an operating state information of the card information screen 411B at a timing point of dragging the notification bar 310 and a configuration setting information of the mobile terminal 100 in association with the card information screen 411B and then saves the created setting information in the memory 170. Subsequently, the controller 180 creates a shortcut item 410C for a shortcut to the card information screen 411B and is then able to display the created shortcut item 410C on the home screen 300.

For another instance, if the card information screen 411B is long touched in FIG. 3C (a), the controller 180 creates a setting information including an operating state information of the card information screen 411B at a timing point of applying the long touch and a configuration setting information of the mobile terminal 100 in association with the card information screen 411B and then saves the created setting information in the memory 170. Subsequently, the controller 180 creates a shortcut item 410C for a shortcut to the card information screen 411B and is then able to display the created shortcut item 410C on a home screen 300.

FIG. 4A shows a running process when the content that is an existing game application.

Referring to FIG. 4A, if an item 420A of a game application is selected from a home screen 300 [FIG. 4A (a)], the controller 180 displays a running screen 420B of the game application [FIG. 4A (b)].

In doing so, despite that a user wants to have a sound not outputted during running the game application, if a sound output of the game application in the configuration setting of the mobile terminal is set to ON, a sound of the game application is outputted during running the game application. Hence, it is inconvenient for the user to change the configuration setting of the mobile terminal 100 so that the sound output is turned off (or a vibration is outputted) each time the game application is run.

Figure 4B:
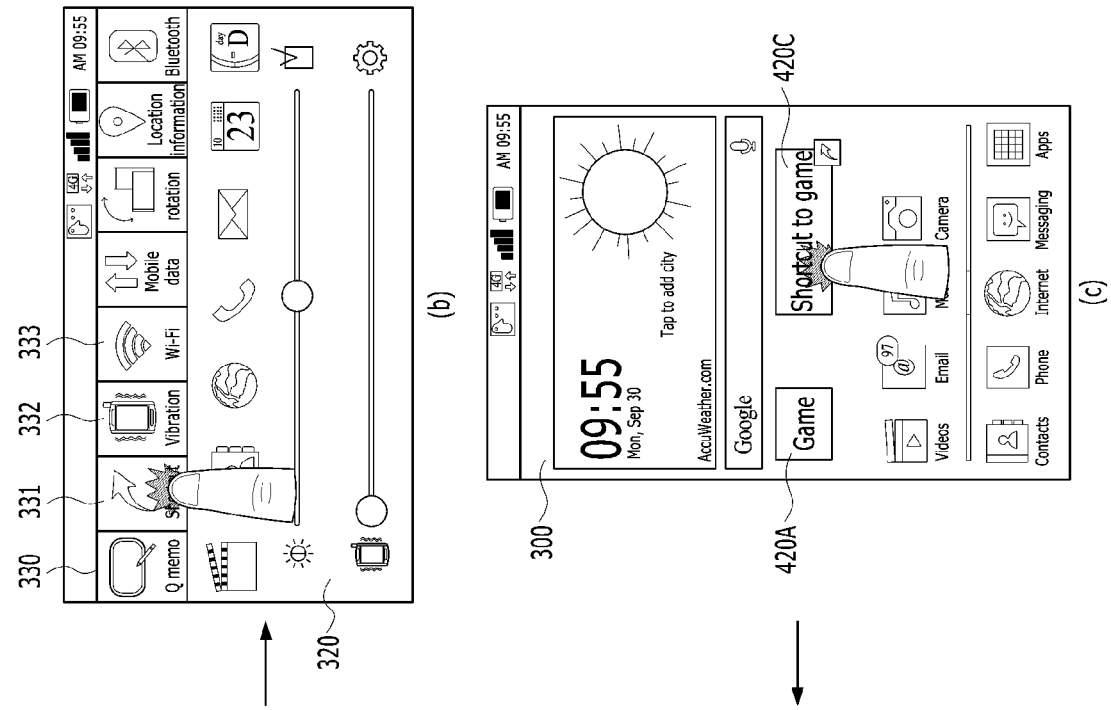

Yet, according to the present invention, like the example shown in FIG. 4B, it is able to use the game application while the sound output of the game application is turned off through a shortcut item.

For instance, referring to FIG. 4B, while a running screen 420B of a game application is displayed, if a touch gesture of dragging a notification bar 310 located at a top end of the running screen 420B to a bottom end of the running screen 420B is inputted [FIG. 4B (a)], the controller 180 can display a notification window 320 including a configuration setting UI 330 [FIG. 4B (b)].

Subsequently, a user changes a configuration setting of the mobile terminal for the use of the game application into a desired configuration setting through the configuration setting UI 330 and is then able to create a shortcut item 410C by selecting a shortcut creation menu 331.

For instance, if a user changes the configuration setting of the mobile terminal 100 for the game application by selecting a vibration menu 332 and a Wi-Fi menu 333 in the configuration setting UI and then selects the shortcut creation menu 331, the controller 180 creates a setting information including an operating state information of the game application at a timing point of selecting the shortcut creation menu 331 and a configuration setting information of the mobile terminal 100 in association with the game application and then saves the created setting information in the memory 170. Subsequently, the controller 180 creates a shortcut item 420C for a shortcut to the game application and is then able to display the created shortcut item 420C on the home screen 300 [FIG. 4B (c)].

Thereafter, if the shortcut item 420C is selected, the controller 180 runs the game application from an operation timing point at a timing point of creating the shortcut item 420C in the setting state corresponding to the configuration setting information of the mobile terminal 100 in association with the game application based on the setting information of the game application corresponding to the shortcut item 420C [FIG. 4B (d)].

For instance, since the vibration menu 332 and the Wi-Fi menu 333 are selected as the configuration setting information of the mobile terminal 100 in association with the game application, if the shortcut item 420C is selected, the controller 180 outputs the vibration instead of the sound of the game application by running the game application within the Wi-Fi network only.

FIG. 5A shows a running process when the content that is an existing gallery application for providing a photo viewer function.

Referring to FIG. 5A, if an item 430A of a gallery application is selected from a home screen 300 [FIG. 5A (a)], the controller 180 displays a running screen 430B of the gallery application [FIG. 5A (b)].

In doing so, after the running screen 430B of the gallery application has been displayed in a portrait mode of a screen mode of the mobile terminal 100, although a user rotates the mobile terminal 100 by switching the screen mode to a landscape mode from the portrait mode, since an auto screen rotation function of the mobile terminal 100 is not set up, the running screen 430B fails to be displayed in the landscape mode [FIG. 5A (b)].

Yet, referring to FIG. 5B, while a running screen 430B of a gallery application is displayed, if a touch gesture of dragging a notification bar 310 located at a top end of the running screen 430B to a bottom end of the running screen 430B is inputted [FIG. 5B (a)], the controller 180 displays a notification window 320 including a configuration setting UI 330 [FIG. 5B (b)].

In doing so, after an auto screen rotation menu 335 has been selected by a user through the configuration setting UI 330, if a shortcut creation menu 331 is selected, the controller 180 creates a setting information including an operating state information of the gallery application at a timing point of selecting the shortcut creation menu 331 and a configuration setting information of the mobile terminal 100 in association with the gallery application and then saves the created setting information in the memory 170. Subsequently, the controller 180 creates a shortcut item 430C for a shortcut to the gallery application and is then able to display the created shortcut item 430C on the home screen 300 [FIG. 5B (c)].

Thereafter, if the shortcut item 430C is selected, the controller 180 runs the gallery application from an operation timing point at a timing point of creating the shortcut item 420C in the setting state corresponding to the configuration setting information of the mobile terminal in association with the gallery application based on the setting information of the gallery application corresponding to the shortcut item 430C [FIG. 5B (d)].

For instance, since the auto screen rotation menu 335 is selected as the configuration setting information of the mobile terminal 100 in association with the gallery application, if the shortcut item 430C is selected, the controller 180 displays a running screen 430B of the gallery application. Thereafter, each time the mobile terminal 100 is rotated, the controller 180 controls the running screen 430B to be displayed in a mode (e.g., a landscape mode, a portrait mode, etc.) corresponding to a direction of the rotation of the mobile terminal 100.

FIG. 6A shows a running process when the content that is an existing map application for providing a location information.

Referring to FIG. 6A, if an item 440A of a map application is selected from a home screen 300 [FIG. 6A (a)], the controller 180 displays a running screen 440B of the map application [FIG. 6A (b)].

In doing so, while a location information function is not set up in the mobile terminal 100, if the map application is run, since a popup window indicating that the location information function needs to be activated is displayed each time [FIG. 6A (b)], it is inconvenient to use a function of the map application in direct.

Yet, referring to FIG. 6B, while the controller 180 displays a running screen 440B of the map application, if a touch gesture of dragging a notification bar 310 located at a top end of the running screen 440B to a bottom end of the running screen 440B is inputted [FIG. 6B (a)], the controller 180 displays a notification window 320 including a configuration setting UI 330 [FIG. 6B (b)].

In doing so, after a location information menu 336 has been selected by a user through the configuration setting UI 330, if a shortcut creation menu 331 is selected, the controller 180 creates a setting information including an operating state information of the map application at a timing point of selecting the shortcut creation menu 331 and a configuration setting information of the mobile terminal 100 in association with the map application and then saves the created setting information in the memory 170. Subsequently, the controller 180 creates a shortcut item 440C for a shortcut to the map application and is then able to display the created shortcut item 440C on a home screen 300 [FIG. 6B (c)].

Thereafter, if the shortcut item 440C is selected, the controller 180 runs the map application from an operation timing point at a timing point of creating the shortcut item 440C in the setting state corresponding to the configuration setting information of the mobile terminal 100 in association with the map application based on the setting information of the map application corresponding to the shortcut item 440C [FIG. 6B (d)]

For instance, since the location information menu 336 is selected as the configuration setting information of the mobile terminal 100 in association with the map application, if the shortcut item 440C is selected, the controller 180 activates the position location module 115 in direct and then provides the function of the map application to a user based on the location information obtained through the position location module 115.

Figure 7:
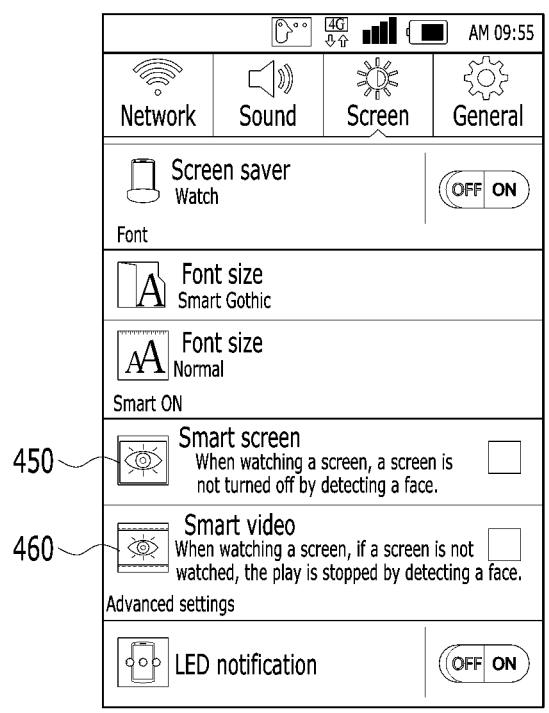

FIG. 7 shows a configuration setting menu including a smart screen menu 450 and a smart video menu 460 of the mobile terminal.

Referring to FIG. 7, the smart screen menu 450 is a function of determining whether a user stares at a screen of the touchscreen 151 through the camera 121 and then turning off the screen in case of determining that the user does not stare at the screen. In this case, the screen includes every screen on which information except a video play screen is displayed.

The smart video menu 460 is a function of determining whether a user stares at a play screen of a video through the camera 121 in the course of playing the video through a video application and then pausing the video play in case of determining that the user does not stare at the screen.

In doing so, while the controller 180 displays a running screen of a specific content (e.g., a webpage), if a shortcut item for a shortcut to the webpage is created after selecting the smart screen menu 450 and the created shortcut item is then selected, the controller 180 displays a running screen of the webpage at a timing point of creating the shortcut item and is also able to activate the smart screen function for the running screen of the webpage.

Moreover, while the controller 180 displays a running screen of a specific video, if a shortcut item for a shortcut to the video is created after selecting the smart video menu 460 and the created shortcut item is then selected, the controller 180 displays a play screen of the video at a timing point of creating the shortcut item and is also able to activate the smart video function for the play screen of the video.

FIG. 8 and FIG. 9 show a running process when the content includes a folder for keeping at least one application.

Referring to FIG. 8, while the controller 180 displays a folder 470 configured to keep at least one or more applications 471 to 473, if a touch gesture of dragging a notification bar 310 located at a top end of a screen to a bottom end of the screen is inputted [FIG. 8 (a)], the controller 180 displays a notification window 320 including a configuration setting UI 330 [FIG. 8 (b)].

In doing so, after a Wi-Fi menu 333 has been selected by a user through the configuration setting UI 330, if a shortcut creation menu 331 is selected, the controller 180 saves a function of the Wi-Fi menu 333 as a configuration setting information of the mobile terminal 100 for the folder 470 in the memory 170.

Since the function of the Wi-Fi menu 33 is set as the configuration setting information of the mobile terminal 100 for the folder 470, when the applications 471 to 473 kept in the folder 470 are run, the controller 180 controls communication operations of the applications 471 to 473 to be performed within the Wi-Fi network only.

For instance, if a vibration menu function is set up as a configuration setting information of the mobile terminal 100 for the folder 470, when the applications 471 to 473 kept in the folder 470 are run, the controller 180 controls vibration to be outputted instead of sounds of the applications 471 to 473.

In particular, referring to FIG. 8, a user keeps the applications 471 to 473, which are frequently used at a home in a Wi-Fi environment, in the folder 470 and then sets up a function of the Wi-Fi menu 333 in the folder 470 through the shortcut creation menu 331 of the present invention. Hence, the user is able to collectively change the configuration settings of the applications 471 to 473 through the folder without changing the settings of the applications 471 to 473 one by one.

Meanwhile, after a specific application previously located outside the folder 470 has been moved into the folder 470, if a command for running the specific application moved into the folder 470 is inputted, the controller 180 can control the corresponding application to be run in the setting state corresponding to the configuration setting information set up in the folder 470.

For instance, as the configuration setting information set up in the folder 470, the Wi-Fi menu function 333 is set up in the folder 470. In doing so, if a command for running the application moved into the folder 470 is inputted, the controller 180 runs the application and is also able to control a communication operation of the application to be performed within the Wi-Fi network only.

On the other hand, if the application moved into the folder 470 is moved out of the folder 470 again or a command for running the specific application is inputted after deleting the folder 480, the controller 180 can control the corresponding application not to be run in the setting state corresponding to the configuration setting information set up in the folder 470.

Referring to FIG. 9 (a) and FIG. 9 (b), a user keeps applications 481 to 483, which frequently use a short range communication within a car, in a folder 480 and sets up a function of a short range communication menu (Bluetooth) 337 in the folder 480 through a shortcut creation menu 331 of the present invention. Hence, the user is able to collectively change the configuration settings of the applications 481 to 483 through the folder 480 without changing the configuration settings of the applications 481 to 483 one by one.

Meanwhile, if a new application is kept in the folder 480, when the new application is run, the controller 180 can control a short range communication to be automatically connected to the car through the short range communication module 114.

Figure 10:
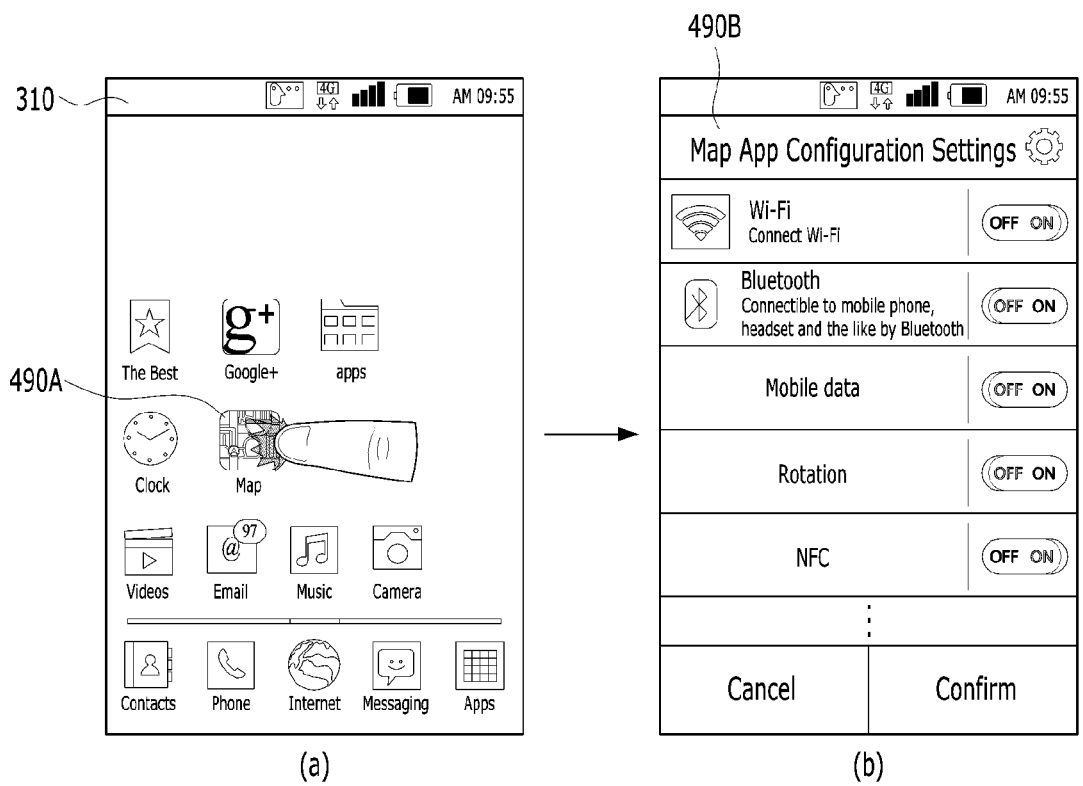

Referring to FIG. 10, on behalf of the steps S100 to S300 shown in FIG. 3, while a home screen including an item 490A of at least one application is displayed, if the item 490A is selected (long touched) [FIG. 10 (a)], the controller 180 displays a configuration setting UI 490B for the configuration setting of the mobile terminal 100 in association with the application [FIG. 10 (b)]. If a configuration of the mobile terminal 100 for an operation of the application is set up through the configuration setting UI 490B or an existing configuration setting is changed, the set or changed configuration setting can be saved as the setting information in the memory 170.

Thereafter, if the item 490A of the application is reselected, the application is directly run in the setting state corresponding to the setting information.

Referring to FIG. 11, while items 420A and 430A of at least one or more applications and setting informations 420C and 430C related to running operations of the applications are displayed on a home screen 300, if the $1^{st}$ setting information 420C is touched and then dragged & dropped on a location of the $2^{nd}$ setting information 430C [FIG. 11 (a)], the controller 180 may change an attribute of the $1^{st}$ setting information 420C into that of the $2^{nd}$ setting information 430C or may change an attribute of the $2^{nd}$ setting information 430C into that of the $1^{st}$ setting information 420C [FIG. 11 (b)]. In doing so, the controller 180 changes the attribute of the $1^{st}$ setting information 420C into that of the $2^{nd}$ setting information 430C and is also able to control a $1^{st}$ application corresponding to the $1^{st}$ setting information 420C to be automatically run in the setting state corresponding to the changed $1^{st}$ setting information 420C.

If the item 420A of the $1^{st}$ application is touched and then dragged & dropped on a location of the $2^{nd}$ setting information 430C, the controller 180 may change the attribute of the $1^{st}$ setting information 420C corresponding to the $1^{st}$ application to that of the $2^{nd}$ setting information 430C or may change the attribute of the $2^{nd}$ setting information 430C into that of the $1^{st}$ setting information 420C. In doing so, the controller 180 changes the attribute of the $1^{st}$ setting information 420C of the $1^{st}$ application into that of the $2^{nd}$ setting information 430C and is also able to control the $1^{st}$ application to be automatically run in the setting state corresponding to the changed $1^{st}$ setting information 420C.

If the item 430A of the $2^{nd}$ application is touched and then dragged & dropped on a location of the $1^{st}$ setting information 420C, the controller 180 may change the attribute of the $2^{nd}$ setting information 430C corresponding to the $2^{nd}$ application to that of the $1^{st}$ setting information 420C or may change the attribute of the $1^{st}$ setting information 420C into that of the $2^{nd}$ setting information 430C. In doing so, the controller 180 changes the attribute of the $2^{nd}$ setting information 430C of the $2^{nd}$ application into that of the $1^{st}$ setting information 420C and is also able to control the $2^{nd}$ application to be automatically run in the setting state corresponding to the changed $2^{nd}$ setting information 430C.

Finally, referring to FIG. 12 (a), if a touch gesture of dragging a notification bar 310 located at a top end of a home screen in a bottom end direction of the home screen is inputted, the controller 180 displays a notification window, which includes the setting informations 420C and 430C of at least one or more applications, between the top end of the home screen and a dragged part of the touch gesture.

In doing so, if at least two points of the notification bar 310 are touched, dragged in a predetermined distance in the bottom end direction of the home screen, and then stopped, the controller 180 stops the notification bar 310 as well and is able to display a notification window, which includes the setting informations 420C and 430C of the at least one or more applications, between the top end of the home screen and a drag stopped part of the touch gesture.

Referring to FIG. 12 (b), if the $1^{st}$ setting information 420C is touched and then dragged & dropped on a location of a specific application item 430A in the home screen outside the notification window, the controller 180 changes the attribute of the $1^{st}$ setting information 420C into that of the $2^{nd}$ setting information 430C corresponding to the specific application or may change the attribute of the $2^{nd}$ setting information 430C into that of the $1^{st}$ setting information 420C. In doing so, the controller 180 changes the attribute of the $2^{nd}$ setting information 430C corresponding to the specific application into that of the $1^{st}$ setting information 420C and is also able to control the specific application to be automatically run in the setting state corresponding to the changed $2^{nd}$ setting information 430C.

Moreover, if the specific application item 430A is touched and then dragged & dropped on a location of the $1^{st}$ setting information 420C within the notification window, the controller 180 changes the attribute of the $2^{nd}$ setting information 430C corresponding to the specific application into that of the $1^{st}$ setting information 420C or may change the attribute of the $1^{st}$ setting information 420C into that of the $2^{nd}$ setting information 430C.

While the present invention has been described and illustrated herein with reference to the preferred embodiments thereof, it will be apparent to those skilled in the art that various modifications and variations can be made therein without departing from the spirit and scope of the invention.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

Thus, the above descriptions are to be considered in all respects as illustrative and not restrictive. The scope of the invention should be determined by reasonable interpretation of the appended claims and all change which comes within the equivalent scope of the invention are included in the scope of the invention.

What is claimed is:

1. A mobile terminal, comprising:
a memory configured to store information related to the mobile terminal;
a touchscreen configured to display an execution screen of a first application; and
a controller configured to:
when a notification bar located at a top end in the execution screen of the first application is touched and the notification bar is dragged to a bottom end of the execution screen, control the touchscreen to display a notification window switched from the execution screen of the first application, wherein the notification window includes a UI (user interface) for a configuration setting of the mobile terminal associated with an operation of the first application and the UI includes a shortcut creation menu for creating a shortcut item of the first application, when the shortcut creation menu is selected, obtain a setting state related to an operation of the first application at a timing point of the selection of the shortcut creation menu, store a first setting information including the obtained setting state of the first application in the memory, control the touchscreen to display a shortcut item for executing the first application in the setting state corresponding to the first setting information, and when the displayed shortcut item is selected, execute the first application corresponding to the selected shortcut item in the setting state of the stored first setting information corresponding to the selected shortcut item, wherein the controller is further configured to:

control the touchscreen to display a home screen including an item indicating a second application, when at least two points of the notification bar located at a top end in the home screen are touched and dragged in a predetermined distance in a bottom end direction of the home screen, control the touchscreen to display the notification window in a display region between the top end of the home screen and a location of the dragged notification bar, wherein the notification window includes the stored first setting information, when the first setting information in the notification window is touched and the touched first setting information is dragged and dropped in a location of the item in the home screen outside the notification window, change a setting state of a second setting information related to an operation of the second application corresponding to the item into that of the setting state of the first setting information, and automatically execute the second application in the setting state corresponding to the changed second setting information.

2. The mobile terminal of claim 1, wherein the first setting information comprises at least one of an operating state information on a specific operation timing point of the selection of the shortcut creation menu and a configuration setting information of the mobile terminal in association with an operation of the first application.

3. The mobile terminal of claim 2, wherein when the shortcut item is selected, the controller is further configured to control the first application to be directly executed from a timing point corresponding to the operating state information.

4. The mobile terminal of claim 2, wherein when the shortcut item is selected, the controller is further configured to control the first application to be directly executed in a setting state corresponding to the configuration setting information of the mobile terminal.

5. The mobile terminal of claim 1, wherein the controller is further configured to control the touchscreen to display a screen including an item indicating at least one application, wherein when the item is selected, the controller is further configured to control the touchscreen to display the UI, and wherein when a configuration setting information of the mobile terminal is set up via the UI, the controller is further configured to create the set configuration setting information and stores the created configuration setting information in the memory.

6. The mobile terminal of claim 1, wherein the touchscreen is further configured to display a folder including at least one application, wherein the memory is further configured to store a configuration setting information of the mobile terminal set for the folder, and wherein when the at least one application in the folder is executed, the controller is further configured to execute the application in a setting state corresponding to the configuration setting information.

7. A method of providing a shortcut for an application of a mobile terminal, the method comprising:

displaying, on a touchscreen of the mobile terminal, an execution screen of a first application;

when a notification bar located at a top end in the execution screen of the first application is touched and the notification bar is dragged to a bottom end of the execution screen, displaying a notification window switched from the execution screen of the first application, wherein the notification window includes a UI (user interface) for a configuration setting of the mobile terminal associated with an operation of the first application and the UI includes a shortcut creation menu for creating a shortcut item of the first application;

when the shortcut creation menu is selected, obtaining a setting state related to an operation of the first application at a timing point of the selection of the shortcut creation menu;

storing, in a memory of the mobile terminal, a first setting information including the obtained setting state of the first application;

displaying a shortcut item for executing the first application in the setting state corresponding to the first setting information;

when the displayed shortcut item is selected, executing the first application corresponding to the selected shortcut item in the setting state of the stored first setting information corresponding to the selected shortcut item;

displaying a home screen including an item indicating a second application;

when at least two points of the notification bar located at a top end in the home screen are touched and dragged in a predetermined distance in a bottom end direction of the home screen, displaying the notification window in a display region between the top end of the home screen and a location of the dragged notification bar, wherein the notification window includes the stored first setting information;

when the first setting information in the notification window is touched and the touched first setting information is dragged and dropped in a location of the item in the home screen outside the notification window, changing a setting state of a second setting information related to an operation of the second application corresponding to the item into that of the setting state of the first setting information; and automatically executing the second application in the setting state corresponding to the changed second setting information.

8. The method of claim 7, wherein the first setting information comprises at least one of an operating state information on a specific operation timing point of the selection of the shortcut creation menu and a configuration setting information of the mobile terminal in association with an operation of the first application.

9. The method of claim 8, wherein the executing step comprises when the shortcut item is selected, directly executing the first application from a timing point corresponding to the operating state information or in a setting state corresponding to the configuration setting information of the mobile terminal.

* * * * *